United States Patent Office 2,721,456
Patented Oct. 25, 1955

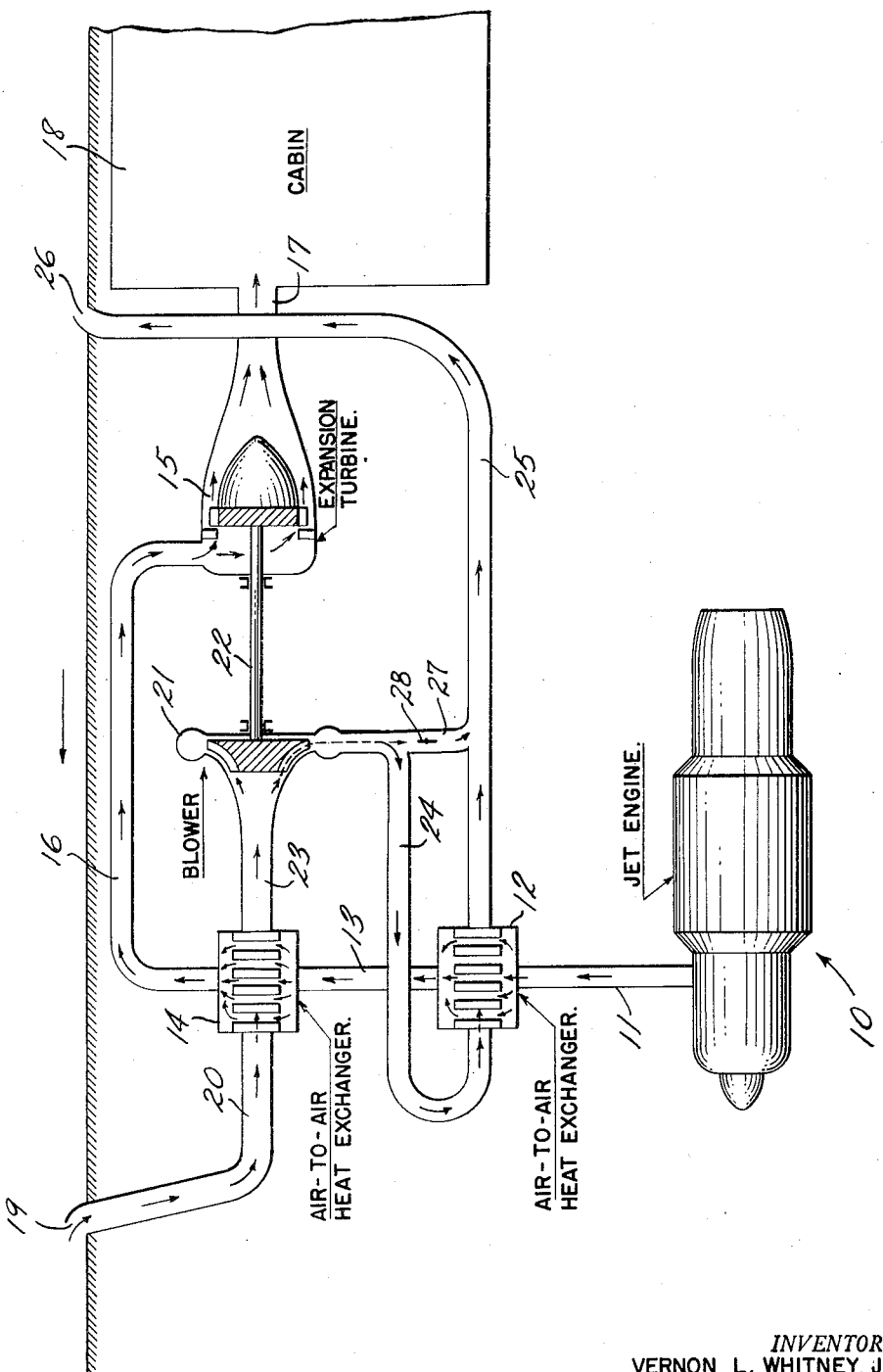

2,721,456

AIRCRAFT AIR CONDITIONING SYSTEM

Vernon L. Whitney, Jr., Hicksville, and John L. Weiler, Freeport, N. Y., assignors to Fairchild Engine and Airplane Corporation, Bay Shore, N. Y., a corporation of Maryland Application July 14, 1953, Serial No. 367,958

4 Claims. (Cl. 62—136)

This invention relates to air conditioning systems, and has particular reference to air cycle cooling systems wherein the ventilating air which is supplied to either pressurized or unpressurized compartments must be cooled and where the air conditioning system may be used to supply the thermodynamic functions of both cooling and pressurization.

Maintaining a controlled temperature of the ventilating air used for cooling purposes in pressurized or unpressurized aircraft compartments is a relatively simple matter for low speed aircraft which are intended to operate at speeds approximating 500 miles per hour or less. The continual renewal of cabin air or compartment air, or both, is required because of the heating effects due to air friction, personnel body heat, and solar, mechanical and electrical equipment radiant heat.

The most widely accepted cooling system which is used in present low speed aircraft to accomplish the required cooling and pressurization, or both, is termed the "Simple" system. The simple air cycle cooling system is operated by bleed air which is at a high pressure and temperature. The bleed air can be supplied from any source of high pressure air within the airplane, the most commonly used source being the aircraft engine compressor. Since the bleed air is at an appreciably higher temperature than can be used directly in the airplane's cabin, the bleed air is first cooled in an air-to-air heat exchanger which appreciably lowers its temperature to a level approaching that of the ram air ambient temperature. The high pressure bleed air is then finally cooled by expansion in a suitable air turbine and supplied to the cabin or compartments. The power obtained from the air turbine is used to drive the cooling air blower which draws in static or ram air from outside the airplane and supplies all or part of the pressure required to circulate the cooling air through the low pressure side of the air-to-air heat exchanger.

In aircraft which are intended to fly at high speeds, say 500 miles per hour or more, the high speed of the aircraft results in a temperature rise of the air immediately surrounding the aircraft due to its ram compression. It is from this source that the cooling air blower of the simple system draws in its cooling air for circulation through the low pressure side of the air-to-air type of heat exchanger. When the atmospheric air is already warm, as would be the case during summer days, the added temperature rise of the surrounding air due to its ram compression, would immediately further increase the temperature by 45° F. Therefore, for the aforementioned summer day conditions when the cooling requirements of the aircraft would be maximum, although the atmospheric temperature could be 100° F., the minimum cooling air temperature available in the low pressure side of the air-to-air heat exchanger would be about 145° F. As airplane speeds are increased at the expense of greater power expenitures of the aircraft engine, the higher power condition results in higher bleed air pressures and temperatures to the simple system, along with higher available cooling air temperatures resulting from the increased speed. To provide the same temperature of cooler air entering the aircraft's cabin or compartment with the simple system, higher heat rejections are required in the air-to-air type of heat exchanger. The high temperature of the cooling air in the low pressure side of the air-to-air heat exchanger added to the high heat rejections now required, results in a considerable temperature rise of the cooling air before it enters the cooling air blower; so much so that special high temperature bearings and cooling devices are required. Also, a steel blower wheel is required, since an aluminum wheel would have a critical reduction of strength at the elevated inlet temperatures. In addition to the above mechanical disadvantages of the simple system, the high bleed air temperatures and pressures entering the air-to-air heat exchanger necessitates the use of special materials for the entire heat exchanger, thereby increasing the overall weight of the cooling system. Finally, since it is indicated that future flight patterns will be at higher altitudes and higher speeds, high compression ratios in the propulsion engines will be required, with the result that the bleed air obtained from these engines will be at a considerably higher temperature and pressure than has been required, thereby imposing mechanical and thermal loads on both the heat exchanger and the air cycle machine which will severely decrease the effectiveness of the simple system, and in many instances, render it obsolete.

In accordance with the present invention, an air conditioning system particularly adapted for high speed aircraft is provided, in which the desirable features inherent in the simple system for low speed aircraft are retained, and which is independent of the ram effects on the cooling air circuit and overcomes the aforementioned mechanical and thermal disadvantages of the simple system without requiring a substantial amount of additional equipment to increase the weight or complexity of the system.

More particularly, the aircraft air conditioning system of this invention comprises a source of high pressure cabin air and a source of low pressure atmospheric cooling air, the latter being first supplied to the main air-to-air heat exchanger for purposes of removing a portion of the heat from the high pressure cabin air before the low pressure cooling air enters the cooling air blower. The cooling air blower draws its supply of cooling air either from a source which is at ambient static conditions, or at ram air conditions. The low pressure cooling air is then compressed in the cooling air blower and discharged to an auxiliary heat exchanger when precooling of the high pressure air takes place. Upon leaving the auxiliary air-to-air heat exchanger, the spent cooling air is then exhausted to the atmosphere. An expansion air turbine driven by the cooled high pressure cabin air drives the cooling air circulating blower, the resulting expansion cooled cabin air is supplied to the cabin or other compartments for cooling the same and, if required, increasing the pressure therein to the desired degree.

For low speed flight as would be required for long range cruising where the power output of the engine and the cabin or compartment cooling requirements would be low, a marked decrease in cooling capacity is accomplished in the system of this invention by providing a by-pass duct which allows the cooling air blower discharge to by-pass the auxiliary air-to-air heat exchanger and discharge the spent air to the atmosphere. The high pressure bleed air is therefore cooled only in the main air-to-air heat exchanger and by means of expansion cooling in the air turbine.

It will be seen that the high speed aircraft cabin cooling and pressurizing system utilizes series heat exchangers through which the low pressure atmospheric cooling air is circulated by the blower whose inlet air is not highly heated by the high pressure cabin air since the latter has been precooled in the auxiliary air-to-air heat exchanger before being supplied to the main air-to-air heat exchanger, so that a special high temperature blower wheel is not required and the low weight aluminum rotor wheel used in the conventional simple system may be retained. The expansion in the turbine driven by the high pressure cabin air effects the substantial temperature drop necessary to cool the cabin, notwithstanding the relatively high temperatures of the ram-heated cooling air and of the cabin air from the high compression engine bleed.

For a more complete understanding of the invention, reference may be had to the accompanying drawing which is a schematic diagram of the aircraft cabin air conditioning system of this invention.

Referring to the drawing, numeral 10 designates a suitable high pressure cabin air source which is shown by way of example as a jet engine, and from whose air compressor the cabin air is bled through air duct 11, so that in effect, the pressure of the cabin air is boosted by the compressor of engine 10 to a point materially higher than that of atmospheric air taken directly from the slip stream.

The duct 11 leads the cabin air to the headers and tubes of the auxiliary air-to-air heat exchanger 12 wherein the high pressure cabin air passing through the tubes thereof undergoes the first reduction in temperature. The precooled cabin air then is conducted by duct 13 to a main air-to-air heat exchanger 14 wherein it undergoes the second reduction in temperature. The air-to-air type of heat exchangers 12 and 14 appreciably reduce the temperature of the high pressure cabin air, the maximum cooling of which is determined by the temperature of the cooling air used.

The third reduction in temperature of the high pressure cabin air is accomplished by expansion cooling in the turbine 15 to which it is supplied from the main heat exchanger 14 by duct 16. The cooled and expanded cabin air leaving the turbine 15 is led by duct 17 to the airplane cabin 18 or cockpit to be used for either cabin cooling and ventilating or pressurization. The expansion ratio across the turbine 15, and hence, the amount of temperature drop available in this cooling stage is governed mainly by the turbine efficiency. A further influence on the amount of cooling available by use of the expansion turbine 15 is the system configuration, both upstream and downstream of the turbine. The downstream pressure is controlled by the desired cabin pressure and the existing duct losses. The pressure at the upstream side of the turbine 15 is governed by the bleed air pressure available at the engine 10, the pressure drop through the heat exchangers 12 and 14 and the ducting losses upstream of the expansion turbine 15, which are a function of the particular airplane installation.

The cooling air which is supplied to the series heat exchangers 12 and 14 is obtained from the relatively low pressure source afforded by the atmosphere through a suitable opening 19 in the skin of the aircraft and preferably arranged for ram pressure recovery so that the cooling air supplied by duct 20 to auxiliary heat exchanger 14 is under some pressure.

The work done by the expanding high pressure cabin air in the turbine 15 is absorbed by a blower 21 which is coupled to the turbine shaft 22. The blower 21 draws cooling air through ducts 20 and 23 and forces it through duct 24 to the main heat exchanger 14 in which the heat rejected by the cabin air is absorbed by the cooling air, thus causing a considerable rise in temperature of the cooling air to which is added the heat of compression of the cooling air by the blower 21. However, an adequate temperature differential between the cabin air and the cooling air is still available in the auxiliary heat exchanger 12 to cause a further rise in temperature of the cooling air as it picks up the heat rejected by the cabin air in the auxiliary heat exchanger 12. The hot cooling air leaving the auxiliary heat exchanger 12 then passes through a duct 25 to an eduction port 26 in the airplane skin where it is exhausted to the atmosphere.

A by-pass 27 connects blow discharge duct 24 to the spent cooling air duct 25. A butterfly valve 28, located in the by-pass duct 27 may be opened or closed to allow the by-passing of the blower discharge directly into duct 25 thereby precluding the precooling of the cabin air in the auxiliary heat exchanger 12.

Operation of the aircraft air conditioning system of this invention under flight conditions will be understood from the foregoing description. During its operation while the airplane is on the ground, the ram air pressure at cooling air inlet 19 would be zero, but the system is not inoperative as is the case with systems that require ram air pressure for heat exchanging purposes, since only a portion of the high pressure cabin air heat from the compressor of engine 10 is rejected to the cooling air in main heat exchanger 14 before the cooling air enters the blower 21, the major portion of the heat having been removed from the high pressure cabin air in the auxiliary heat exchanger 12 at the downstream side of the blower 21. Hence, neither the blower 21 nor the remainder of the air circulating system are overheated and operate under favorable overall conditions, largely because the air conditioning system of this invention is independent of a ram air source and thus is essentially indifferent to the speed of the airplane. This desirable circumstance enables the system to be designed for maximum efficiency at maximum cooling load condition without danger of unloading the blower 21 at high flight speeds due to high cooling air pressures at the blower inlet.

Furthermore, since a positive supply of cooling air is continually circulated through and efficiently used in the system of this invention, even though its temperature and pressure may vary between ambient static pressure and temperature to high ram temperature and pressure, the cooling air inlet 19 and in fact, the entire system may be located anywhere in the aircraft with a consequent reduction in that part of the airplane drag which is directly chargeable to the air conditioning system.

Although a preferred embodiment of the invention has been illustrated and described herein, it will be understood that the invention is not limited thereby, but is susceptible of changes in form and detail within the scope of the appended claims.

We claim:

1. In an air conditioning system for aircraft and the like having at least one compartment to be cooled, the combination of a source of cabin supply air under pressure, a source of cooling air, an expansion turbine driven by the cabin air from said first-named source and discharging the expanded air to said compartment for cooling the same, a blower driven by said turbine and having an inlet connected to said second-named source and outlet, a spent cooling air discharge connected to said blower outlet, a heat exchanger interposed between said first-named source and the inlet to said blower and supplied with cooling air from said second-named source for precooling the cabin air prior to admission thereof to said turbine, and a second heat exchanger interposed between said spent cooling air discharge and outlet from said blower for precooling said cabin air prior to admission to said first heat exchanger.

2. In an air conditioning system for aircraft and the like having at least one compartment to be cooled, the combination of a source of cabin supply air under pressure, a source of cooling air, an expansion turbine, a duct leading the pressure cabin air from said first-named source to said turbine, a connection leading the expanded air from said turbine to said compartment for cooling the same, a blower driven by said turbine and having an inlet and an outlet, a second duct connecting said second-named source to said blower inlet, a spent cooling air discharge port, a third duct connecting said blower outlet to said discharge port, a main air-to-air heat exchanger in said first and second ducts for cooling the cabin air prior to admission thereof to said turbine, with an auxiliary air-to-air heat exchanger in said first and third ducts for precooling said cabin air prior to admission to said main heat exchanger.

3. In an air conditioning system for aircraft and the like having at least one compartment to be cooled, the combination of a source of cabin supply air under pressure, a source of cooling air, an expansion turbine, a duct leading the pressure cabin air from said first-named source to said turbine, a connection leading the expanded air from said turbine to said compartment for cooling the same, a pair of air-to-air heat exchangers connected in series by said duct, a blower driven by said turbine and having an inlet and an outlet, a second duct connecting said cooling air source to one of said heat exchangers and to said blower inlet, a spent cooling air discharge port, and a third duct connecting said blower outlet to said other heat exchanger and to said discharge port.

4. In an air conditioning system for aircraft and the like having at least one compartment to be cooled, the combination of a source of cabin supply air under pressure, a source of cooling air, an expansion turbine, a duct leading the pressure cabin air from said first-named source to said turbine, a connection leading the expanded air from said turbine to said compartment for cooling the same, a pair of air-to-air heat exchangers having first and second air passages in heat exchanging relation therein, the first passages of the heat exchangers being connected in series by said duct, a blower driven by said turbine and having an inlet and an outlet, a second duct connecting said cooling air source to the second passage of one of said heat exchangers and to said blower inlet, a spent cooling air discharge port, a third duct connecting said blower outlet to the second passage of said other heat exchanger and to said discharge port, and a by-pass between said blower outlet and said discharge port for by-passing said other heat exchanger at will.

References Cited in the file of this patent

UNITED STATES PATENTS

| | | |
|---|---|---|
| 2,485,590 | Green | Oct. 25, 1949 |
| 2,509,899 | Wood | May 30, 1950 |
| 2,585,570 | Messinger | Feb. 12, 1952 |
| 2,628,482 | Burgess | Feb. 17, 1953 |